United States Patent
Takada

(10) Patent No.: US 10,982,587 B2
(45) Date of Patent: Apr. 20, 2021

(54) PRE-CHAMBER TYPE INTERNAL COMBUSTION ENGINE

(71) Applicant: TOYOTA JIDOSHA KABUSHIKI KAISHA, Toyota (JP)

(72) Inventor: Noriyuki Takada, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/578,590

(22) Filed: Sep. 23, 2019

(65) Prior Publication Data

US 2020/0165962 A1 May 28, 2020

(30) Foreign Application Priority Data

Nov. 22, 2018 (JP) .............. JP2018-219141

(51) Int. Cl.
*F02B 19/16* (2006.01)
*H01T 13/54* (2006.01)
*F02B 19/10* (2006.01)
*H01T 13/16* (2006.01)
*F02B 19/12* (2006.01)

(52) U.S. Cl.
CPC .......... *F02B 19/16* (2013.01); *F02B 19/1023* (2013.01); *H01T 13/16* (2013.01); *H01T 13/54* (2013.01); *F02B 19/12* (2013.01)

(58) Field of Classification Search
CPC ...... F02B 19/16; F02B 19/1023; F02B 19/12; H01T 13/54; H01T 13/06
USPC ....................................................... 123/285
See application file for complete search history.

(56) References Cited

U.S. PATENT DOCUMENTS

| | | | | |
|---|---|---|---|---|
| 3,512,907 A | * | 5/1970 | Belzner | F02B 53/12 418/113 |
| 2013/0139784 A1 | * | 6/2013 | Pierz | F02B 19/12 123/254 |
| 2014/0165958 A1 | * | 6/2014 | Lee | F02M 21/0275 123/260 |

FOREIGN PATENT DOCUMENTS

| | | | |
|---|---|---|---|
| JP | 2007-138909 A | | 6/2007 |
| JP | 2007138909 A | * | 6/2007 |
| JP | 2012-047115 A | | 3/2012 |
| JP | 2012-047144 A | | 3/2012 |
| WO | WO-2018087418 A1 | * | 5/2018 .......... F02B 19/1014 |

* cited by examiner

*Primary Examiner* — Mahmoud Gimie
(74) *Attorney, Agent, or Firm* — Oblon, McClelland, Maier & Neustadt, L.L.P.

(57) ABSTRACT

A cylinder head (3) is formed with a pre-chamber (12) surrounded by a thin pre-chamber wall (11) sticking out from the inside wall surface of the cylinder head (3) to the inside of a main combustion chamber (5). Inside the pre-chamber (12), the electrode of a spark plug (15) is arranged. When the spark plug (15) is used to burn the air-fuel mixture inside the pre-chamber (12), jet flames are ejected from the communication holes (13) to the main combustion chamber (5). The thin pre-chamber wall (11) is formed into a two-layer structure of an outside wall (11a) facing the main combustion chamber (5) and an inside wall (11b) facing the pre-chamber (12). The inside wall (11b) is formed by a material with a higher heat conductivity than the outside wall (11a).

4 Claims, 3 Drawing Sheets

PRE-CHAMBER TYPE INTERNAL COMBUSTION ENGINE

FIELD

The present invention relates to a pre-chamber type internal combustion engine.

BACKGROUND

Known in the art is a pre-chamber type internal combustion engine in which a main combustion chamber is formed between the inside wall surface of a cylinder head made of a metal and the top surface of a piston, a pre-chamber surrounded by a thin pre-chamber wall sticking out from the inside wall surface of the cylinder head to the inside of the main combustion chamber is formed at the cylinder head, communication holes communicating the inside of the pre-chamber and the inside of the main combustion chamber are formed inside the thin pre-chamber wall, the electrode of a spark plug is arranged in the pre-chamber, and, when the spark plug is used to make the air-fuel mixture in the pre-chamber burn, jet flames are ejected from the communication holes to the main combustion chamber, the thin pre-chamber wall is made a two-layer structure of the outside wall facing the main combustion chamber and the inside wall facing the pre-chamber, and the outside wall is formed by a material higher in heat conductivity than the inside wall (see for example Japanese Unexamined Patent Publication No. 2007-138909).

SUMMARY

Technical Problem

In this pre-chamber type internal combustion engine, at the time of engine high load, the front end of the thin pre-chamber wall exposed inside the main combustion chamber becomes excessively high in temperature, and the danger of the front end of the thin pre-chamber wall acting as a heat source resulting in self ignition of the air-fuel mixture in the main combustion chamber, that is, the danger of premature ignition of the air-fuel mixture in the main combustion chamber, has been focused on.

In this case, in this pre-chamber type internal combustion engine, in order to keep the air-fuel mixture in the main combustion chamber from prematurely igniting, it is necessary to enable the heat of the front end of the thin pre-chamber wall to escape to the cylinder head to lower the temperature of the front end of the thin pre-chamber wall. Based on this thinking, the thin pre-chamber wall is formed into a two-layer structure of the outside wall facing the main combustion chamber and the inside wall facing the pre-chamber and the outside wall is formed by a material higher in heat conductivity than the inside wall. If in this way the outside wall of the thin pre-chamber wall is formed by a material higher in heat conductivity than the inside wall, the heat of the front end of the thin pre-chamber wall exposed at the inside of the main combustion chamber is conducted through the outside wall with the high heat conductivity to the cylinder head, so the temperature of the front end of the thin pre-chamber wall exposed inside the main combustion chamber falls and, as a result, the air-fuel mixture in the main combustion chamber is kept from prematurely igniting.

However, premature ignition of the air-fuel mixture in a pre-chamber type internal combustion engine occurs due to the fact that in the combustion chamber as a whole including the main combustion chamber and the pre-chamber, the location becoming the highest in temperature becomes a heat source. In this case, in a pre-chamber type internal combustion engine with the electrode of a spark plug arranged in the pre-chamber, in the combustion chamber as a whole including the main combustion chamber and the pre-chamber, the electrode of the spark plug in the pre-chamber becomes highest in temperature. Therefore, premature ignition of the air-fuel mixture most easily occurs in the pre-chamber around the electrode of the spark plug. In this case, to keep premature ignition of the air-fuel mixture in the pre-chamber from occurring, a gas temperature inside the pre-chamber has to be lowered, and to do so, it is necessary to escape the heat of the inside wall of the thin pre-chamber wall to the outside. However, in the above-mentioned pre-chamber type internal combustion engine, the inside wall of the thin pre-chamber wall is formed by a material with a lower heat conductivity than the outside wall, so it is difficult to cause heat to escape from the inside wall of the thin pre-chamber wall and as a result there is the problem of premature ignition of the air-fuel mixture in the pre-chamber.

To solve the above problem, according to the present invention, there is provided a pre-chamber type internal combustion engine comprising;
a main combustion chamber formed between an inside wall surface of a metal cylinder head and a top surface of a piston,
a pre-chamber formed at the cylinder head and surrounded by a thin pre-chamber wall sticking out from the inside wall surface of the cylinder head to the inside of the main combustion chamber, said thin pre-chamber wall having communication holes formed therein and communicating an inside of the pre-chamber and an inside of the main combustion chamber, and
a spark plug having an electrode arranged in the pre-chamber, jet flames being ejected from the communication holes to the main combustion chamber when an air-fuel mixture in the pre-chamber is burned by the spark plug, wherein
the thin pre-chamber wall is made a two-layer structure of an outside wall facing the main combustion chamber and an inside wall facing the pre-chamber, and the inside wall is formed by a material with a higher heat conductivity than the outside wall.

Advantageous Effects of Invention

By forming the inside wall of the thin pre-chamber wall by a material with a higher heat conductivity than the outside wall, it is possible to lower the temperature of the inside wall of the thin pre-chamber wall and thereby possible to suppress premature ignition of the air-fuel mixture in the pre-chamber.

DESCRIPTION OF EMBODIMENTS

Figure 1:
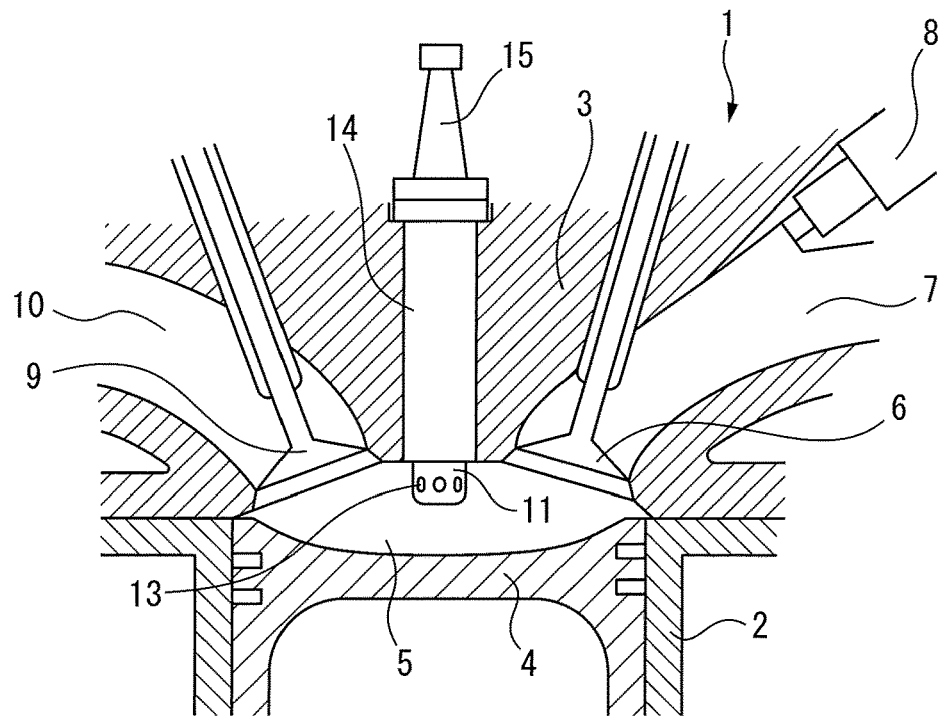
FIG. 1 is a side view of a pre-chamber type internal combustion engine.

FIG. 1 shows an overall view of a pre-chamber type internal combustion engine using gasoline as fuel. If referring to FIG. 1, 1 indicates an engine body, 2 a cylinder block, 3 a cylinder head made of a metal and attached on the cylinder block 2, 4 a piston reciprocating inside the cylinder block 2, 5 a main combustion chamber formed between the inside wall surface of the cylinder head 3 made of a metal and the top surface of the piston 4, 6 an intake valve, 7 an intake port, 8 a fuel injector arranged inside the intake port 7, 9 an exhaust valve, and 10 an exhaust port.

Figure 2:
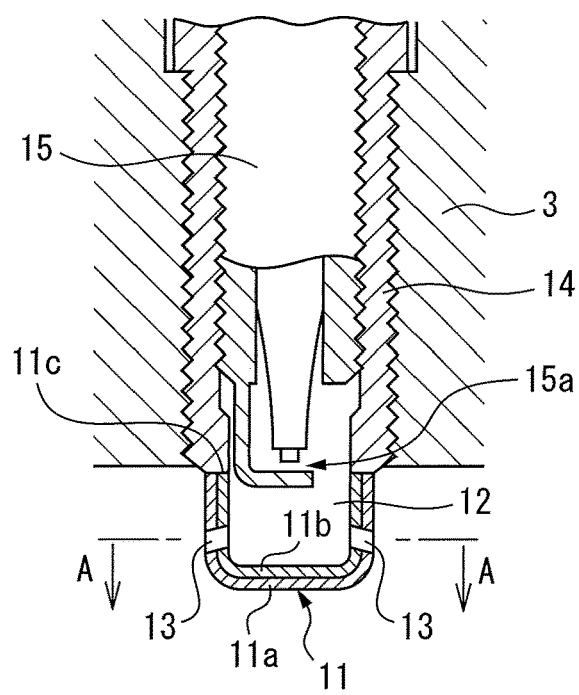
FIG. 2 is an enlarged side cross-sectional view of the surroundings of a pre-chamber.
Figure 3:
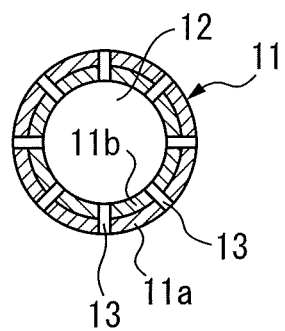
FIG. 3 is a cross-sectional view seen along the A-A section of FIG. 2.

As shown in FIG. 1 and FIG. 2, the cylinder head 3 is formed with a pre-chamber 12 surrounded by a thin pre-chamber wall 11 sticking out from the inside wall surface of the cylinder head 3 to the inside of the main combustion chamber 5. As shown in FIG. 2, this thin pre-chamber wall 11 is formed by a two-layer structure of the outside wall 11a facing the main combustion chamber 5 and the inside wall 11b facing the pre-chamber 12. The inside wall 11b is formed by a material with a higher heat conductivity than the outside wall 11a. In this case, for example, the inside wall 11b is formed from a metal material, while the outside wall 11a is formed from a ceramic. Inside the thin pre-chamber wall 11, a plurality of communication holes 13 are formed communicating the inside of the pre-chamber 12 and the inside of the main combustion chamber 5. In the embodiment shown in FIG. 1 and FIG. 2, as shown in FIG. 3, these communication holes 13 extend radially from the inside of the pre-chamber 12 toward the inside of the main combustion chamber 5.

As shown in FIG. 2, inside the cylinder head 3, a metal hollow sleeve 14 is screwed. Inside this hollow sleeve 14, the body of the spark plug 15 is screwed. In this case, in the embodiment shown in FIG. 2, the body of the spark plug 15 is screwed into the hollow sleeve 14 so that the discharge gap 15a of the spark plug 15 is positioned at substantially the same height position as the ring-shaped end face 11c of the thin pre-chamber wall 11. The pre-chamber 12 is formed between the front end of the spark plug 15 inserted into the hollow sleeve 14 and the inside surface of the thin pre-chamber wall 11. Note that, in the embodiment shown in FIG. 2, the ring-shaped end face 11c of the thin pre-chamber wall 11, that is, the ring-shaped end face of the outside wall 11a of the thin pre-chamber wall 11 and the ring-shaped end face of the inside wall 11b of the thin pre-chamber wall 11, are connected to the front end face of the hollow sleeve 14 by welding.

In the pre-chamber type internal combustion engine shown in FIG. 1, when the intake valve 6 opens, the fuel injected from the fuel injector 8 is supplied together with the intake air to the inside of the main combustion chamber 5. Due to this, an air-fuel mixture is formed inside the main combustion chamber 5. Next, when the compression stroke is started, the air-fuel mixture inside the main combustion chamber 5 flows in from the communication holes 13 to the pre-chamber 12. Next, when reaching the end period of the compression stroke, the spark plug 15 ignites the air-fuel mixture in the pre-chamber 12, whereby jet flames are ejected from the communication holes 13 of the pre-chamber 12 toward the inside of the main combustion chamber 5. The air-fuel mixture inside the main combustion chamber 5 is made to rapidly burn by these jet flames.

Further, when the compression stroke is started and the air-fuel mixture inside the main combustion chamber 5 flows from the communication holes 13 to the inside of the pre-chamber 12, this air-fuel mixture is heated by the high temperature inside surface of the thin pre-chamber wall 11. As a result, the gas temperature inside the pre-chamber 12 becomes higher. On the other hand, in a pre-chamber type internal combustion engine where the electrode of the spark plug 15 is arranged in the pre-chamber 12, in the combustion chamber as a whole including both the main combustion chamber 5 and the pre-chamber 12, the electrode of the spark plug 15 inside the pre-chamber 12 becomes highest in temperature. Therefore, inside the pre-chamber 12 around the electrode of the spark plug 15, premature ignition of the air-fuel mixture most easily occurs.

However, in the embodiment according to the present invention, the inside wall 11b of the thin pre-chamber wall 11 is formed by material with a high heat conductivity. Therefore, the heat of the gas inside the pre-chamber 12 passes through the inside wall 11b of the thin pre-chamber wall 11, is allowed to escape to the hollow sleeve 14, then is allowed to escape to the cylinder head 3. Further, the outside wall 11a of the thin pre-chamber wall 11 is formed by material with a low heat conductivity. Therefore, the heat generated inside the main combustion chamber 5 is kept from being conveyed to the gas inside the pre-chamber 12. Note that, in this case, even if part of the heat generated at the main combustion chamber 5 is conveyed to the inside wall 11b of the thin pre-chamber wall 11, this heat escapes to the cylinder head 3. Therefore, the gas temperature inside the pre-chamber 12 is kept low, and even if the electrode of the spark plug 15 becomes higher in temperature, premature ignition of the air-fuel mixture inside the sub chamber 12 is suppressed.

Figure 4A:
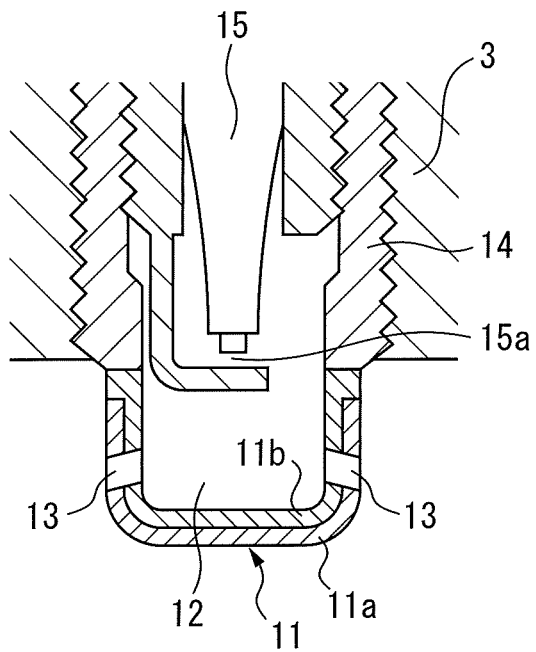
FIGS. 4A and 4B are enlarged side cross-sectional views of the surroundings of a pre-chamber showing other embodiments.
Figure 4B:
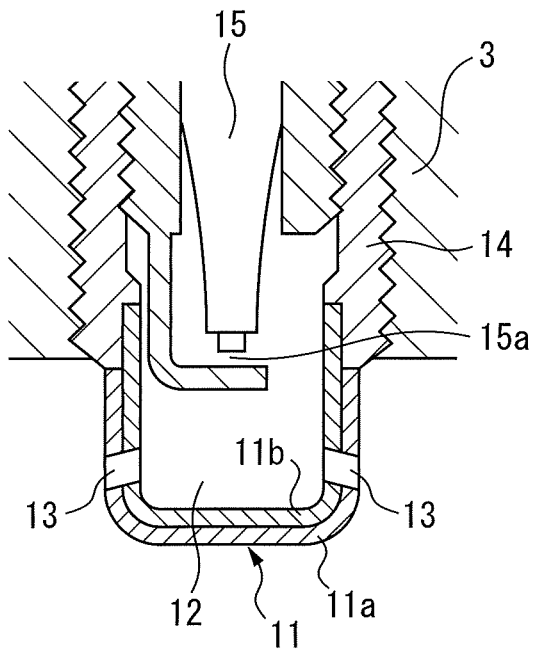

FIG. 4A and FIG. 4B show other embodiments designed to increase the contact area between the inside wall 11b of the thin pre-chamber wall 11 and the hollow sleeve 14 so as to make it easier for the heat of the inside wall 11b to escape through the hollow sleeve 14 to the cylinder head 3. In the embodiment shown in FIG. 4A, the ring-shaped end part of the thin pre-chamber wall 11 is not provided with the outside wall 11a. At the ring-shaped end part of the thin pre-chamber wall 11, the inside wall 11b is increased in thickness compared with the part other than the ring-shaped end part of the thin pre-chamber wall 11. Therefore, in the embodiment shown in FIG. 4A, the ring-shaped end face of only the inside wall 11b is bonded with the front end face of the hollow sleeve 14. On the other hand, in the embodiment shown in FIG. 4B, the inside wall 11b of the thin pre-chamber wall 11 sticks out from the ring-shaped end face of the outside wall 11a to the axial direction of the thin pre-chamber wall 11, and the sticking out part of this inside wall 11b is press fit into or screwed into the hollow sleeve 14.

Figure 5:
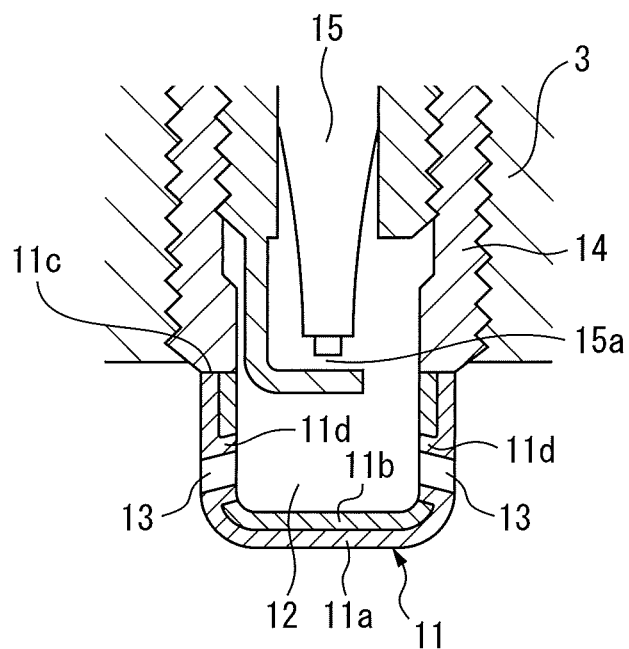
FIG. 5 is an enlarged side cross-sectional view of the surroundings of a pre-chamber showing still further embodiment.

FIG. 5 shows still another embodiment. In this embodiment, the entire outer circumferential surfaces around portions of the communication hole 13 passing through the inside wall 11b of the thin pre-chamber wall 11 are formed by a material with a lower heat conductivity than the inside wall 11b. In this case, in the embodiment shown in FIG. 5, part 11d of the outside wall 11a extends toward the inside of the pre-chamber 12 through the inside wall 11b up to the inside surface of the thin pre-chamber wall 11 in a tubular form. Inside of this tubular shaped parts 11d of the outside wall 11a, the communication holes 13 are formed. That is, in the embodiment shown in FIG. 5, the communication holes 13 are surrounded over their entire lengths by circumferential walls made of a material with a lower heat conductivity than the inside wall 11b.

If in this way the communication holes 13 are surrounded over their entire lengths by circumferential walls made of a material with a lower heat conductivity than the inside wall 11b, when jet flames are ejected from the pre-chamber 12 through the communication holes 13 to the inside of the main combustion chamber 5, the jet flames are not cooled much at all by the circumferential wall surfaces of the communication holes 13 when flowing through the communication holes 13. As a result, the ejection forces of the jet flames when being ejected from the communication holes 13 are kept from declining. Therefore, for example, even when the engine temperature is low, high ejection forces of jet flames can be secured. As a result, the air-fuel mixture inside the main combustion chamber 5 can be made to burn well.

Figure 6:
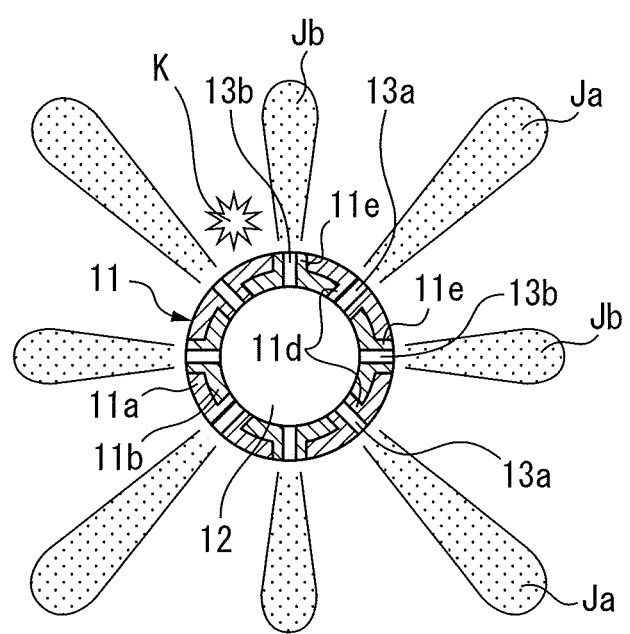
FIG. 6 is an enlarged plan cross-sectional view of the surroundings of a pre-chamber showing still further embodiment.

FIG. 6 shows still another embodiment. In this embodiment, first communication holes 13a where the entire outer circumferential surfaces around portions of the communication hole passing through the inside wall 11b of the thin pre-chamber wall 12 are formed by a material with a lower heat conductivity than the inside wall 11b and second communication holes 13b where the entire outer circumferential surfaces around portions of the communication hole passing through the outside wall 11a of the thin pre-chamber wall 12 are formed by a material with a higher heat conductivity than the outside wall 11a are alternately formed. That is, in this embodiment, part 11d of the outside wall 11a extends toward the inside of the pre-chamber 12 through the inside of the inside wall 11b up to the inside surface of the thin pre-chamber wall 11 in a tubular form. Inside of these tubular shaped parts 11d of the outside wall 11a, the first communication holes 13a are formed. That is, the first communication holes 13a are surrounded over their entire lengths by circumferential walls made of a material with a lower heat conductivity than the inside wall 11b.

On the other hand, in this embodiment, part 11e of the inside wall 11b extends toward the inside of the main combustion chamber 5 through the outside wall 11a up to the outside surface of the thin pre-chamber wall 11 in a tubular form, and the second communication holes 13b are formed by the tubular shaped part 11e of the inside wall 11b. That is, the second communication holes 13b are surrounded over their entire lengths by circumferential walls made of a material with a higher heat conductivity than the outside wall 11a.

If, like the first communication holes 13a, the communication holes are surrounded over their entire lengths by circumferential walls with a lower heat conductivity than the inside wall 11b, the jet flames ejected from the pre-chamber 12 are not cooled much at all by the circumferential wall surfaces of the first communication holes 13a when flowing through the inside of the first communication holes 13a. As a result, as shown by Ja in FIG. 6, the ejection forces of the jet flames become higher. As opposed to this, if like the second communication holes 13b, the communication holes are surrounded over their entire lengths by circumferential walls with a higher heat conductivity than the outside wall 11a, the jet flames ejected from the sub chamber 12 are robbed of heat at the circumferential wall surfaces of the communication holes 13 when flowing through the inside of the second communication holes 13b. As a result, as shown by Jb in FIG. 6, the ejection forces of the jet flames fall.

Therefore, as shown in FIG. 6, the ejection forces of the jet flames Ja, Jb from the communication holes 13a, 13b become alternately stronger about the cylinder axis. Note that, in the embodiment shown in FIG. 6, the thin pre-chamber wall 11 is formed with eight communication holes 13a, 13b, but the number of the communication holes 13a, 13b may be made four, six, or 10 or another higher even number.

Now the, if the jet flames ejected from the pre-chamber 12 are used to make the air-fuel mixture inside the main combustion chamber 5 burn, the rise in pressure due to the burning the air-fuel mixture will sometimes cause the air-fuel mixture in the surroundings of the main combustion chamber 5 to be compressed and self ignite causing knocking, but if ejecting powerful jet flames Ja from all of the communication holes, as shown by K in FIG. 6, knocking will sometimes occur near the thin pre-chamber wall 11. That is, if ejecting powerful jet flames Ja from all of the communication holes, near the thin pre-chamber wall 11, the jet flames Ja will not sufficiently grow, so flames will not be propagated to the air-fuel mixture near the thin pre-chamber wall 11. Due to the rise in pressure due to the burning the air-fuel mixture, the air-fuel mixture in the main combustion chamber 5 will be compressed and self ignite near the thin pre-chamber wall 11, thus causing knocking.

In this case, as shown in FIG. 6, if ejecting somewhat weak jet flames Jb between powerful jet flames Ja, since the jet flames Jb will be propagated up to near the thin pre-chamber wall 11, the flames will cause the air-fuel mixture near the thin pre-chamber wall 11 to burn. As a result, the air-fuel mixture self igniting near the thin sub chamber wall 11 and causing knocking will be prevented. Note that, it is possible to weaken the jet flames by making the diameters of the communication holes smaller, but if reducing the diameters of the communication holes, the jet flames become rod shapes without broadening. If the jet flames become rod shapes in this way, the jet flames no longer propagates to the air-fuel mixture near the thin pre-chamber wall 11. As a result, the air-fuel mixture in the main combustion chamber 5 self ignites near the thin pre-chamber wall 11, and knocking occurs. Therefore, even if simply reducing the diameters of the communication holes, it is not possible to prevent the occurrence of knocking.

The invention claimed is:

1. A pre-chamber type internal combustion engine comprising;
    a main combustion chamber formed between an inside wall surface of a metal cylinder head and a top surface of a piston,
    a pre-chamber formed at the cylinder head and surrounded by a thin pre-chamber wall sticking out from the inside wall surface of the cylinder head to an inside of the main combustion chamber, said thin pre-chamber wall having communication holes formed therein and communicating an inside of the pre-chamber and the inside of the main combustion chamber, and
    a spark plug having an electrode arranged in the pre-chamber, jet flames being ejected from the communication holes to the main combustion chamber when an air-fuel mixture in the pre-chamber is burned by the spark plug, wherein
    said thin pre-chamber wall is made of a two-layer structure of an outside wall facing the main combustion chamber and an inside wall facing the pre-chamber, and the inside wall is formed by a material with a higher heat conductivity than the outside wall, and the entire outer circumferential surface around a portion of the communication hole passing through the inside wall of the thin pre-chamber wall is formed by a material with a lower heat conductivity than the inside wall.

2. The pre-chamber type internal combustion engine according to claim 1, wherein at least the inside wall of the thin pre-chamber wall is connected to a front end of a metal hollow sleeve, the pre-chamber is formed between a front end of the spark plug inserted into the hollow sleeve and the inside surface of the thin pre-chamber wall, and the hollow sleeve is inserted into the cylinder head made of a metal.

3. A pre-chamber type internal combustion engine comprising;
- a main combustion chamber formed between an inside wall surface of a metal cylinder head and a top surface of a piston,
- a pre-chamber formed at the cylinder head and surrounded by a thin pre-chamber wall sticking out from the inside wall surface of the cylinder head to the inside of the main combustion chamber, said thin pre-chamber wall having communication holes formed therein and communicating an inside of the pre-chamber and an inside of the main combustion chamber, and
- a spark plug having an electrode arranged in the pre-chamber, jet flames being ejected from the communication holes to the main combustion chamber when an air-fuel mixture in the pre-chamber is burned by the spark plug, wherein
- said thin pre-chamber wall is made of a two-layer structure of an outside wall facing the main combustion chamber and an inside wall facing the pre-chamber, and the inside wall is formed by a material with a higher heat conductivity than the outside wall, and
- first communication holes where the entire outer circumferential surfaces around portions of the communication hole passing through the inside wall of the thin pre-chamber wall are formed by a material with a lower heat conductivity than the inside wall and second communication holes where the entire outer circumferential surfaces around portions of the communication hole passing through the outside wall of the thin pre-chamber wall are formed by a material with a higher heat conductivity than the outside wall are alternately formed.

4. The pre-chamber type internal combustion engine according to claim 3, wherein at least the inside wall of the thin pre-chamber wall is connected to a front end of a metal hollow sleeve, the pre-chamber is formed between a front end of the spark plug inserted into the hollow sleeve and the inside surface of the thin pre-chamber wall, and the hollow sleeve is inserted into the cylinder head made of a metal.

* * * * *